United States Patent
Gobert

(10) Patent No.: US 8,559,751 B2
(45) Date of Patent: Oct. 15, 2013

(54) METHOD AND DEVICE FOR REMOVING MOTION BLUR EFFECTS

(75) Inventor: Jean Gobert, Alfortville (FR)

(73) Assignee: NXP B.V., Eindhoven (NL)

( * ) Notice: Subject to any disclaimer, the term of this patent is extended or adjusted under 35 U.S.C. 154(b) by 1430 days.

(21) Appl. No.: 11/995,037

(22) PCT Filed: Jul. 3, 2006

(86) PCT No.: PCT/IB2006/052227
§ 371 (c)(1),
(2), (4) Date: Jan. 8, 2008

(87) PCT Pub. No.: WO2007/007225
PCT Pub. Date: Jan. 18, 2007

(65) Prior Publication Data
US 2010/0119171 A1    May 13, 2010

(30) Foreign Application Priority Data
Jul. 12, 2005    (EP) .................................... 05300579

(51) Int. Cl.
*G06K 9/40*    (2006.01)

(52) U.S. Cl.
USPC ..................... 382/275; 382/107; 348/208.99

(58) Field of Classification Search
USPC ................................ 382/107, 255, 264, 275;
348/208.99–208.16
See application file for complete search history.

(56) References Cited

U.S. PATENT DOCUMENTS

| | | | | |
|---|---|---|---|---|
| 5,430,479 A | * | 7/1995 | Takahama et al. | 348/207.99 |
| 5,473,379 A | * | 12/1995 | Horne | 375/240.16 |
| 5,497,191 A | * | 3/1996 | Yoo et al. | 348/208.6 |
| 5,557,684 A | * | 9/1996 | Wang et al. | 382/107 |
| 5,692,063 A | * | 11/1997 | Lee et al. | 382/107 |
| 5,701,163 A | * | 12/1997 | Richards et al. | 348/578 |
| 7,171,052 B2 | * | 1/2007 | Park | 382/236 |
| 7,639,889 B2 | * | 12/2009 | Steinberg et al. | 382/255 |
| 7,720,150 B2 | * | 5/2010 | Lee et al. | 375/240.16 |
| 7,746,382 B2 | * | 6/2010 | Soupliotis et al. | 348/208.99 |
| 7,885,339 B2 | * | 2/2011 | Li et al. | 375/240.27 |
| 8,189,057 B2 | * | 5/2012 | Pertsel et al. | 348/208.16 |
| 2003/0156203 A1 | * | 8/2003 | Kondo et al. | 348/222.1 |

(Continued)

FOREIGN PATENT DOCUMENTS

| | | |
|---|---|---|
| EP | 1818866 A1 | 8/2007 |
| JP | 2000-023024 | 1/2000 |

OTHER PUBLICATIONS

Ben-Ezra et al., "Motion Deblurring Using Hybrid Imaging", IEEE, Computer Vision and Pattern Recognition Proceedings, Conference Dates Jun. 18-20, 2003.*

(Continued)

*Primary Examiner* — Aaron W Carter

(57) ABSTRACT

The present invention provides an improved method and device for digital motion blur removal by using motion information extracted from a sequence of images captured immediately before the image to be corrected was captured. In particular, the invention includes estimating (56) motion information of the previous sequence of images and analyzing them based on motion estimation techniques and then extrapolating (58) the motion of the image to be corrected based on the motion estimation in order to remove (62) the motion blur effects in the desired captured image. The various types of devices which may implement the method of the present invention will thereby display (64) blur free digital images.

16 Claims, 1 Drawing Sheet

(56) References Cited

U.S. PATENT DOCUMENTS

| | | |
|---|---|---|
| 2003/0223644 A1 | 12/2003 | Park |
| 2004/0001705 A1* | 1/2004 | Soupliotis et al. ............ 386/117 |
| 2004/0066460 A1* | 4/2004 | Kondo et al. .............. 348/222.1 |
| 2004/0091170 A1* | 5/2004 | Cornog et al. ................. 382/276 |
| 2004/0130628 A1 | 7/2004 | Stavely |
| 2004/0201753 A1* | 10/2004 | Kondo et al. ................. 348/239 |
| 2005/0002457 A1* | 1/2005 | Xu et al. .................. 375/240.19 |
| 2006/0098891 A1* | 5/2006 | Steinberg et al. ............. 382/255 |
| 2006/0104365 A1* | 5/2006 | Li et al. .................... 375/240.27 |
| 2006/0125938 A1* | 6/2006 | Ben-Ezra et al. ............. 348/241 |
| 2006/0140455 A1* | 6/2006 | Costache et al. ............. 382/118 |
| 2006/0187342 A1* | 8/2006 | Soupliotis et al. ............ 348/441 |
| 2006/0187359 A1* | 8/2006 | Soupliotis et al. ............ 348/700 |
| 2006/0192857 A1* | 8/2006 | Kondo et al. .............. 348/208.4 |
| 2006/0221211 A1* | 10/2006 | Kondo et al. ................. 348/239 |
| 2006/0227218 A1* | 10/2006 | Kondo et al. .............. 348/208.1 |
| 2006/0227219 A1* | 10/2006 | Kondo et al. .............. 348/208.1 |
| 2006/0227220 A1* | 10/2006 | Kondo et al. .............. 348/208.1 |
| 2006/0241371 A1* | 10/2006 | Rafii et al. ..................... 600/407 |
| 2006/0274156 A1* | 12/2006 | Rabbani et al. .......... 348/208.99 |
| 2006/0290821 A1* | 12/2006 | Soupliotis et al. ............ 348/701 |
| 2007/0092244 A1* | 4/2007 | Pertsel et al. ................. 396/153 |
| 2008/0100716 A1* | 5/2008 | Fu et al. ..................... 348/208.8 |
| 2009/0237516 A1* | 9/2009 | Jayachandra et al. ..... 348/208.4 |
| 2011/0199493 A1* | 8/2011 | Steinberg et al. .......... 348/208.1 |
| 2012/0201293 A1* | 8/2012 | Guo et al. ................ 375/240.02 |

OTHER PUBLICATIONS

Ben-Ezra, M; et al "Motion-Based Motion Deblurring" IEEE Transactions on Pattern Analysis and Machine Intelligence, vol. 26, No. 6, Jun. 2004, pp. 689-698.

"Long, Ming, et al. Motion Filter for Video Stabilizing Systems", J. Tsinghua Univ. (Sci. & Tech.), vol. 45, No. 1, pp. 41-43 & 56 (2005).

Office Action in Chinese Patent Appln. No. 200680025347.5 (Apr. 1, 2010).

* cited by examiner

METHOD AND DEVICE FOR REMOVING MOTION BLUR EFFECTS

FIELD OF THE INVENTION

The present invention relates to motion blur detection and removal, and in particular, the invention relates to a method and device for motion correction and generation of motion blur free images.

BACKGROUND OF THE INVENTION

Digital photography has gained considerable attention and popularity. This is particularly true for nonprofessional photographers. Digital photography has also found increasing use in business and commerce. Instantaneous turnaround and the simplicity with which digital images can be incorporated into electronic documents have made digital image technology one of the most desirable forms to record images.

Conventionally, many handheld devices such as digital cameras and the like have been marketed having built-in blur correcting functions for preventing an adverse effect on a captured image caused by a blur such as a camera shake caused by a user during image capture. Also, images captured on handheld devices may suffer from "motion blur" caused by unwanted shake during image capture of fast moving objects. This is particularly the case for still pictures, where the exposure time may be fairly long, as well as for lightweight handheld devices such as mobile phone cameras, which is difficult to stabilize for image capture.

Typically, various blur correcting techniques have been applied to reverse the adverse effects of motion blur on captured images. For example, US 2004/0130628 A1 describes a method where the capture of a digital image is delayed until the motion of the digital camera satisfies a particular motion criteria. According to this method, the movement factors are analyzed and the capture of the image is delayed until no further movement is detected by a tracking method and a control logic that is configured to delay capture of the image. However, once the image has been captured, no further processing or analysis of the motion is performed on the captured images.

Additionally, other blur correcting functions can be classified into two categories. First, in mechanical and optical correction systems, the motion of an image set is captured by mechanical sensors (accelerometers) and is compensated by optical means (e.g., a deformable prism) so that the image remains stable on the sensor. For example, a sensor such as a vibration gyro senses a motion and, on the basis of the result of sensing, the apical angle of a variable apical angle prism is changed or a part of an image-sensing lens is shifted, thereby preventing a blur of a captured image on an image-sensing surface.

Secondly, in digital image processing correction systems, the captured image is processed "off-line" by methods estimating, by static analysis of the image, the motion that caused the blur, then applying corrections to compensate for it. In other words, the portion of an image sensed by an image-sensing device such as a CCD, which is to be displayed on a display, is changed in accordance with a camera shake, thereby displaying an image with no blur on the display.

However, these conventional blur removal techniques described above are not often satisfactory due to a number of factors. Mechanical and optical correction systems, although they give excellent results, are used mostly on high-end devices because of the high costs associated with their integration into handheld devices. Moreover, their size makes them unattractive for fitting into ever smaller handheld devices. Another limitation is that they can only compensate for camera motion and cannot deblur parts of images in order to compensate the blurring effect of moving objects.

Similarly, digital image processing correction methods are limited in quality because the image restoration is very sensitive to an accurate model of motion. First, this motion information is not available at processing time, and the estimation of motion which can be performed from static image analysis is difficult and not robust. In particular, this system is limiting in situations where a subject motion involves a global translation of arbitrary direction, i.e., not necessarily parallel to one of the horizontal or vertical axes of the image. Moreover, it does not perform well in situations where motion is not a global translation but includes also a rotation and where motion is not homogeneous, but some areas of the image have different specific motions.

Therefore, it is desirable to implement an improved digital motion blur removal method and a corresponding device primarily used to correct blurs of motion images obtained by handheld devices such as video cameras, mobile phone cameras and the like, which avoid the above mentioned problems and can be less costly and simpler to implement.

SUMMARY OF THE INVENTION

Accordingly, it is an object of the invention to provide an improved method and device to generate and display blur free digital images by removing motion blurs associated with unstable capture of images or pictures by using motion information extracted from a sequence of images captured immediately before the image to be corrected was captured. In particular, the invention includes estimating motion information of the previous sequence of images, analyzing them using motion estimation techniques, and then extrapolating the motion of the image to be corrected based on the motion estimation information.

In particular, the invention provides a method of removing motion blur effects of a digital image that is subject to motion correction, where the method includes (a) extracting motion information from a sequence of images captured immediately before a capture of the digital image; (b) extracting timing information of a start time and an end time of the capture of the digital image; (c) generating an estimated motion information for the sequence of images by performing an image to image analysis based on a motion estimation technique using the extracted motion information and the timing information; (d) extrapolating motion information of the digital image in a time interval between the start time and the end time of the capture of the digital image using the estimated motion information image; and (e) removing motion blur effects of the digital image by compensating motion of the digital image using the extrapolated motion information.

One or more of the following features may also be included.

In one aspect of the invention, generating the estimated motion information includes providing an estimated motion vector for every pixel or block of pixels of the image.

In another aspect, the method also includes providing an estimated motion vector using a global motion estimation model. Also, using the global motion estimation model from one image to the next includes subdividing the image into blocks, using a block matching algorithm on each block, and producing as many motion block vectors as blocks.

In yet another aspect, the method also includes using a median filter on block motion vectors and deriving a global motion vector.

Furthermore, the method may also include generating motion vectors corresponding to horizontal (dx) and vertical (dy) translations of motion, as well as generating motion vectors corresponding to rotational translation of motion.

Moreover, generating the estimated motion information may include computing, for each motion vector, an approximate function of time, and minimizing an error criteria at estimated offsets of the sequence of images (n−1).

The invention also relates to a device configured to remove motion blur effects of a digital image subject to motion correction, where the device includes an image sensor adapted to extract motion information from a sequence of images captured immediately before a capture of the digital image; a capture module adapted to extract timing information of a start time and an end time of image capture; a motion estimator adapted to generate an estimated motion information of the sequence of images by performing an image to image analysis based on a motion estimation technique using the extracted motion information and the timing information; a motion extrapolator adapted to estimate motion information of the digital image in a time interval between the start time and the end time of the image using the estimated motion information; and a motion deblur module configured to remove motion blur effects of the digital image by compensating motion of the digital image using the extrapolated motion information.

Other features of the method and device are further recited in the dependent claims.

Still further objects and advantages of the present invention will become apparent to one of ordinary skill in the art upon reading and understanding the following drawings and detailed description of the preferred embodiments. As it will be appreciated by one of ordinary skill in the art, the present invention may take various forms and may comprise various components and steps and arrangements thereof.

Accordingly, these and other aspects of the invention will become apparent from and elucidated with reference to the embodiments described in the following description, drawings and from the claims, and the drawings are for purposes of illustrating a preferred embodiment(s) of the present invention and are not to be construed as limiting the present invention.

DESCRIPTION OF THE PREFERRED EMBODIMENTS

The invention consists in assisting a digital motion blur removal by motion information extracted from a sequence of images captured immediately before the image to be corrected was captured.

Figure 1:
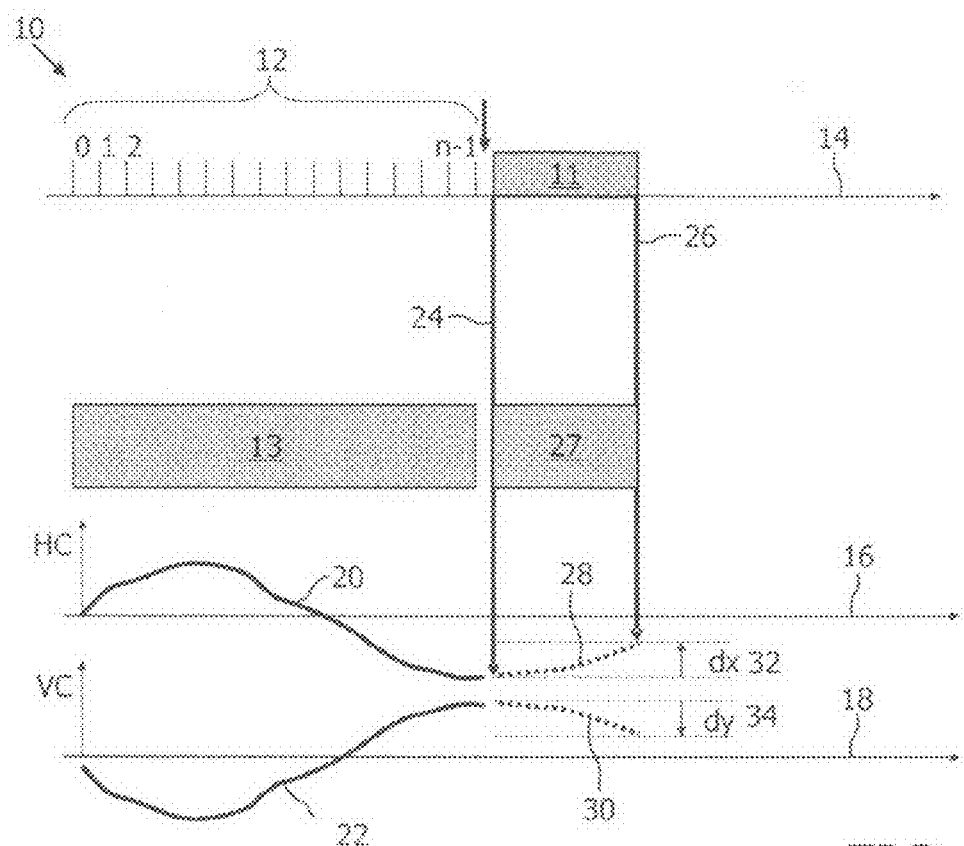
FIG. 1 is a schematic illustration of one of the implementations of an improved method for motion blur removal according to the embodiments of the present invention.

FIG. 1 illustrates a time sequence diagram 10 for capturing an image. In a preview pane 12 on a first horizontal axis 14 (time T), images 0 to n−1 are captured (capture step 11), immediately prior to the image n which is to be corrected for motion blurs. In other words, for example, when a user takes a picture using a handheld camera device, the device is continuously analyzing a sequence of images for preview on the viewfinder screen of the handheld camera device, prior to the user actually hitting a <<take picture>> actuation button. The preview pane 12 on the first horizontal axis 14 shows these preview images.

During the sequence of images of the preview pane 12, the motion from each image to the next one is analyzed, the analyzing step 13 being based, for example, on global motion estimation techniques that model the camera motion. Alternatively, the analysis may be performed by a motion field technique, which models the motion of various areas of the image more accurately.

In the time sequence diagram 10, the preview pane 12 images are analyzed for motion by global translation from image to image. In horizontal axes 16 and 18, the evolution of the horizontal and vertical components HC and VC of the translation vector are illustrated, respectively, as curves 20 and 22. The evolution of the horizontal and vertical components of the translation vector are accumulated and the resulting offsets from the first images are drawn on the two curves on the bottom of the picture. The global motion estimation technique from one image to the next may be performed by subdividing the image into blocks and using a block matching algorithm on each pixel block, producing as many motion vectors as blocks. A median filter on all block motion vectors can then be used to derive a global motion vector.

Still referring to FIG. 1, once the user captures the image (period 11) and <<takes the picture>>, a timing information concerning an image capture start 24 and an image capture end 26 is provided by the system to a "motion extrapolator" 27. The extrapolation 27 performed by this "motion extrapolator" processes information obtained thanks to the analyzing step 13 and the timing information of the image capture start 24 and the image capture end 26 and provides an estimation of the motion in the time interval between the start 24 and the end 26 of the capture of the final picture. This is illustrated as dotted curves 28 and 30 in the horizontal axes 16 and 18, respectively.

In the particular embodiment illustrated on the time sequence diagram 10, this would result in a motion vector component dx 32 and a motion vector component dy 34, which provides the translation from the start 24 and the end 26 of the image capture. A technique that can be used to produce such an extrapolation may compute, for each coordinate of the vector, an approximation function, minimizing an error criterion at estimated offsets of the preview sequence (e.g., General Linear Least Square). The values of the functions are then computed at the start 24 and the end 26 of the image capture, and their differences would provide the extrapolated motion vector components dx 32 and dy 34.

The extrapolated motion information is then fed to a motion deblur device, which optionally refines the motion by picture analysis. This produces a more reliable motion model than what can be obtained by conventional methods based on static picture analysis. Further, this motion model is used to parametrise the correction to the captured image that may use known techniques of deconvolution. A typical parameter set for deconvolution that may be implemented is Point Spread Function (PSF), which represents the effect of blur on a single pixel of a image.

Figure 2:
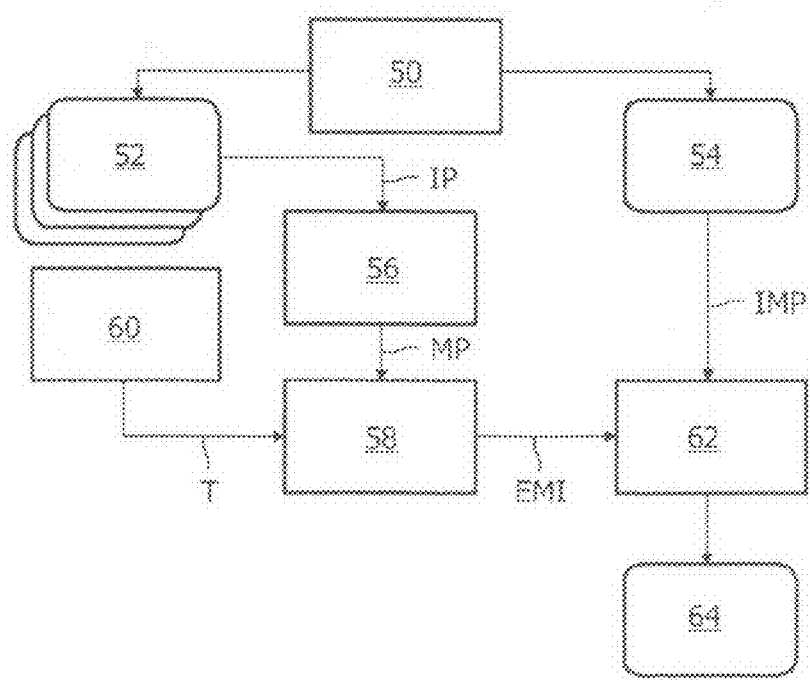
FIG. 2 is a schematic functional and block diagram of a device using the method of FIG. 1.

FIG. 2 shows a diagram which illustrates the functional components of the motion blur removal method and device of the present invention. First, an image sensor 50 converts an optical image captured by a handheld device focused on the sensor into electrical signals. An analysis 52 of previous images is performed and the desired image 54 is captured. Most of today's imaging systems and image sensing devices such as video and digital cameras use charged-coupled devices (CCD) image sensors. CCD image sensors are well known in the art and thus will not be described herein. Additionally, the CMOS technology provides the possibility of integrating image sensing and digital signal processing on the same chip, resulting in faster, smaller, less expensive and lower power image sensing devices.

Thereafter, a motion estimator 56 receives the image pixels IP of the preview images and provides the estimated motion vectors for every pixel. In other words, the motion estimator 56 estimates the motion on n−1 pictures/image frames prior to the capture period of the captured image. As mentioned above, several sophisticated variants of motion estimation techniques may be used: (1) global motion model that gives a parameter set such as translation, zoom rotation values, that are unique for the entire whole image; which enables the derivation of a motion vector for every pixel of the image; (2) block based motion model that provides parameters like translation for each block of the image, which enables derivation of a motion vector for every pixel of the block; or (3) pixel flow technique that explicitly provides the estimated motion of every pixel. The difference among these various types of motion estimation techniques is that they differ by the amount of information (motion of preview MP) to be transmitted from the motion estimator 56 to a functional module that processes the results of the motion estimator 56, namely, a motion extrapolator 58. However, the result is a motion vector for each pixel irrespective of which motion estimation technique is implemented in the device.

Also, depending on the sophisticated motion estimation techniques used, the performance of motion estimation may be improved. Such improvements may include, for example, a fast search algorithm or an efficient computational scheme in addition to the general methods described above. Such methods are well known in the encoding art.

Consequently, the motion estimator 56 provides the motion estimation information MP of the preview images to the motion extrapolator 58. The motion extrapolator 58, in turn, processes the motion estimation information along with the timing information T provided by a capture module 60 regarding the timing information of the image capture start 24 and the image capture end 26 (FIG. 1). Then, the motion extrapolator 58 provides the extrapolated motion information EMI to an image deblur module 62 that analyses and processes the captured image information (i.e. the image pixels IMP) using the extrapolated motion information to compensate the motion of the captured image and generate the desired deblurred image or picture (64). The deblurred image is available at the output of the display module 64.

Additionally, the present invention may be implemented for use in off-line motion compensation or restoration such as on a PC. In such off-line restoration case, motion estimation information or data must be attached to the image to be motion restored or corrected. Further, in addition to handheld camera devices, the invention may also be integrated in video camera devices. In the case of handheld video devices, a particular characteristic of note is that because the capture time is limited by the frame period, the motion removal and correction may be applied to every frame, taking motion analysed from a sliding window of several frames captured before the one being corrected. Also, a variety of handheld or small portable devices can integrate the method and device of the present invention. Namely, digital cameras, USB keys with a camera sensor, mobile phones with camera sensors, camcorders, including all types of integrated circuits for image processing which are integrated into these types of popular consumer devices.

While there has been illustrated and described what are presently considered to be the preferred embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims and their equivalents.

The invention claimed is:

1. A method of removing motion blur effects of a digital image that is subject to motion correction, wherein the method comprises:
 extracting motion information from a sequence of a plurality of images captured immediately before a capture of the digital image;
 extracting timing information of a start time and an end time of the capture of the digital image;
 generating an estimated motion information for the sequence of images by performing an image to image analysis based on a motion estimation technique using the extracted motion information, wherein the estimated motion information comprises an individual motion vector for each pixel of the image;
 extrapolating motion information of the digital image in a time interval between the start time and the end time of the capture of the digital image using the estimated motion information and the extracted timing information of the start time and the end time of the capture of the digital image; and
 removing motion blur effects of the digital image by compensating motion of the digital image using the extrapolated motion information.

2. The method according to claim 1, wherein generating the estimated motion information further comprises providing an estimated motion vector for every block of pixels of the image.

3. The method according to claim 2, wherein generating the estimated motion information comprises providing an estimated motion vector using a global motion estimation model.

4. The method according to claim 3, wherein using the global motion estimation model from one image to the next image in the sequence of images comprises subdividing the image into blocks, using a block matching algorithm on each block, and producing as many motion block vectors as there are blocks.

5. The method according to claim 4, further comprising using a median filter on block motion vectors and deriving a global motion vector from the median filter.

6. The method according to claim 2, wherein generating the estimated motion information comprises providing an estimated motion vector using a block based motion model.

7. The method according to claim 2, wherein generating the estimated motion information comprises providing an estimated motion vector using a pixel flow model.

8. The method according to claim 1, wherein generating the estimated motion information comprises generating motion vectors corresponding to horizontal and vertical translations of motion.

9. The method according to claim 1, wherein generating the estimated motion information comprises generating motion vectors corresponding to rotational translation of motion.

10. The method according to claim 2, wherein generating the estimated motion information comprises computing, for each motion vector, an approximate function of time, and minimizing an error criteria at estimated offsets of the sequence of images.

11. A device configured to remove motion blur effects of a digital image subject to motion correction, wherein the device comprises:
- an image sensor adapted to extract motion information from a sequence of images captured immediately before a capture of the digital image;
- a capture module adapted to extract timing information of a start time and an end time of image capture;
- a motion estimator adapted to generate an estimated motion information of the sequence of images by performing an image to image analysis based on a motion estimation technique using the extracted motion information, wherein the estimated motion information comprises an individual motion vector for each pixel of the image;
- a motion extrapolator adapted to estimate motion information of the digital image in a time interval between the start time and the end time of the image using the estimated motion information and the extracted timing information of the start time and the end time of the capture of the digital image; and
- a motion deblur module configured to remove motion blur effects of the digital image by compensating motion of the digital image using the extrapolated motion information.

12. The device according to claim 11, wherein the motion estimator is further configured to use a global motion estimation model to provide the individual motion vector for each pixel of the image.

13. The device according to claim 11, wherein the motion estimator provides an estimated motion vector using a block based motion model.

14. The device according to claim 11, wherein the motion estimator provides an estimated motion vector using a pixel flow model.

15. A non-transitory computer-readable medium having a sequence of instructions stored thereon which, when executed by a processor of a device, causes the processor to:
- extract motion information from a sequence of images captured immediately before a capture of the digital image;
- extract timing information of a start time and an end time of image capture;
- generate an estimated motion information of the sequence of images by performing an image to image analysis based on a motion estimation technique using the extracted motion information, wherein the estimated motion information comprises an individual motion vector for each pixel of the image;
- extrapolate motion information of the digital image in a time interval between the start time and the end time of the capture of the digital image using the estimated motion information and the extracted timing information of the start time and the end time of the capture of the digital image; and
- remove motion blur effects of the digital image by compensating motion of the digital image using the extrapolated motion information.

16. The method according to claim 2, further comprising:
- using a median filter on the estimated motion vectors for the blocks; and
- deriving a global motion vector from the median filter.

* * * * *